United States Patent
Slabaugh et al.

(10) Patent No.: US 10,329,981 B2
(45) Date of Patent: Jun. 25, 2019

(54) EMISSIONS CONTROL SYSTEM FOR AN ENGINE SYSTEM

(71) Applicant: Caterpillar Inc., Peoria, IL (US)

(72) Inventors: Lane Slabaugh, Lebanon, IN (US); Jason W. Spear, Lafayette, IN (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/688,949

(22) Filed: Aug. 29, 2017

(65) Prior Publication Data
US 2019/0063286 A1    Feb. 28, 2019

(51) Int. Cl.
| | |
|---|---|
| *F01N 3/08* | (2006.01) |
| *F01N 3/20* | (2006.01) |
| *F01N 9/00* | (2006.01) |
| *F01N 3/025* | (2006.01) |
| *F02D 41/14* | (2006.01) |
| *F02D 41/30* | (2006.01) |
| *F02M 26/00* | (2016.01) |

(52) U.S. Cl.
CPC ............ *F01N 3/208* (2013.01); *F01N 3/0253* (2013.01); *F01N 3/0842* (2013.01); *F01N 3/2066* (2013.01); *F01N 9/00* (2013.01); *F02D 41/1461* (2013.01); *F02D 41/30* (2013.01); *F01N 2560/026* (2013.01); *F01N 2610/02* (2013.01); *F01N 2900/0412* (2013.01); *F01N 2900/08* (2013.01); *F02M 26/00* (2016.02); *Y02T 10/24* (2013.01); *Y02T 10/47* (2013.01)

(58) Field of Classification Search
CPC ........ F01N 3/0253; F01N 3/0842; F01N 3/20; F01N 3/2066; F01N 3/208; F01N 9/00; F01N 2560/026; F01N 2610/02; F01N 2900/0412; F01N 2900/08; F02D 41/30; F02M 26/00; Y02T 10/24; Y02T 10/47
See application file for complete search history.

(56) References Cited

U.S. PATENT DOCUMENTS

| | | |
|---|---|---|
| 9,103,248 B2 | 8/2015 | Light-Holets |
| 9,249,752 B2 | 2/2016 | Donaldson et al. |
| 2007/0113544 A1* | 5/2007 | Nishina ................. F01N 3/2066 60/286 |
| 2015/0315945 A1 | 11/2015 | Bergh et al. |
| 2016/0032802 A1* | 2/2016 | Asai ........................ F01N 3/208 60/286 |

FOREIGN PATENT DOCUMENTS

| | | |
|---|---|---|
| EP | 2332826 | 6/2011 |
| EP | 2820276 | 5/2016 |
| WO | WO2017055299 | 4/2017 |

* cited by examiner

*Primary Examiner* — Brandon D Lee

(57) ABSTRACT

An emissions control system for an engine system includes an input device that is configured to provide a plurality of user-selectable operational modes for the engine system in which each operational mode corresponds to an emission regulation standard. The emissions control system also includes a control module that is communicably coupled to the input device. The control module is configured to optimize engine fueling and selectively optimize reductant dosing for the engine system based on the operational mode selected from the plurality of operational modes.

8 Claims, 9 Drawing Sheets

EMISSIONS CONTROL SYSTEM FOR AN ENGINE SYSTEM

TECHNICAL FIELD

The present disclosure generally relates to a control system for regulating performance of an engine system. More particularly, the present disclosure relates to an emissions control system for regulating emissions from an engine system.

BACKGROUND

Many water-borne vessels employ engines as their primary source of power for propelling these vessels on water. In some cases, water bodies may be demarcated based on various emission regulation standards in that—one water body may have a different emission regulation standard from another water body. Therefore, it may be required for a vessel to comply its exhaust emissions with, for example, IMO (International Maritime Organization)-II standard when travelling in a first water body. However, when the vessel moves into another water body different from the first water body, the exhaust emissions from the vessel may be required to comply with a standard different from that of IMO-II, for example, an IMO-III standard. In such cases, vessels that are incapable of complying with a particular emission regulation standard would not be permitted to travel on the water body that is designated with the particular emission regulation standard.

Also, when it is not required to meet a stringent emission regulation standard, such vessels may lack the ability to modulate operation of its engine systems to optimize fuel and reductant usage and therefore, meet a less stringent emission regulation standard that is currently applicable to the engine system. This may increase costs associated with operation of the engine system, for instance, from an increased amount of reductant being used in an after-treatment system of the engine system.

U.S. Pat. No. 9,103,248 discloses a system that is configured to optimize fuel and reductant consumption. Particularly, the '248 patent discloses that an operation mode of an engine and after-treatment system is determined based on a reductant-to-fuel cost ratio. The operation mode would optimize fuel consumption and reductant consumption in an engine system while satisfying a target emissions level. Although such previously known systems could bring about a reduction in the exhaust emissions from engines and after-treatment systems, such systems would be configured to do so for reasons other than complying with changing emission regulation standards—for instance, with the primary intent to optimize the consumption of consumables such as fuel and reductant. Moreover, when fuel and reductant consumption is optimized by taking the reductant-to-fuel cost ratio into consideration, such an implementation may pose challenges in realizing the primary function of regulating quality of exhaust emissions for compliance with a required emission regulation standard.

Hence, there is a need for a system that facilitates compliance of exhaust emissions from engines with changing emission regulation standards that would be typically encountered when marine vessels course through differently designated water bodies.

SUMMARY OF THE DISCLOSURE

In one aspect of this disclosure, an emissions control system for an engine system includes an input device that is configured to provide a plurality of user-selectable operational modes for the engine system in which each operational mode corresponds to an emission regulation standard. The emissions control system also includes a control module that is communicably coupled to the input device. The control module is configured to optimize engine fueling and selectively optimize reductant dosing for the engine system based on the operational mode selected from the plurality of operational modes.

Additionally, the control module may be configured with at least a pair of pre-defined engine fueling maps and at least a pair of pre-defined reductant dosing maps therein. In response to a selection of one of the operational modes, the control module may be configured to activate one of the pre-defined engine fueling maps and selectively activate one of the pre-defined reductant dosing maps based on the selected operational mode such that during subsequent operation of the engine system, the engine system is configured to comply with the selected operational mode corresponding to a desired one of the emission regulation standards.

Further, in response to the selected one of the operational modes and to comply with the desired emission regulation standard, the control module may be configured to independently and selectively vary one or more of an amount of fuel dispensed to an engine during each injection event, and an injection timing associated with the fuel dispensed to the engine such that the amount of fuel and the injection timing corresponds with the activated one of the engine fueling maps.

Additionally, or optionally, in response to the selected one of the operational modes, the control module could also be configured to vary an amount of reductant to be dispensed to an after-treatment system of the engine system such that the amount of reductant corresponds with the activated one of the reductant dosing maps.

In an aspect of the present disclosure, if a zeroth operational mode is selected at the input device, then the control module is configured to activate a first engine fueling map and switch OFF the after-treatment system.

In another aspect of the present disclosure, if a first operational mode is selected at the input device, then the control module is configured to activate a second engine fueling map and activate a first reductant dosing map.

In yet another aspect of the present disclosure, if a second operational mode is selected at the input device, then the control module is configured to activate a third engine fueling map and activate a second reductant dosing map.

In yet another aspect, embodiments herein are also directed to an engine system employing the emissions control system of the present disclosure.

In yet another aspect of the present disclosure, a method for regulating emissions from an engine system to comply with one of a plurality of emission regulation standards is provided. The method includes selecting an operational mode from a plurality of operational modes in which each operational mode corresponds with an emission regulation standard from the plurality of emission regulation standards. Thereafter, the method includes optimizing, by a control module, engine fueling based on the selected operational mode. Further, the method also includes selectively optimizing, by the control module, reductant dosing based on the selected operational mode.

Other features and aspects of this disclosure will be apparent from the following description and the accompanying drawings.

BRIEF DESCRIPTION OF THE DRAWINGS

The features and advantages of the present disclosure will become more apparent from the detailed description set forth below when taken in conjunction with the drawings.

DETAILED DESCRIPTION

Figure 1:
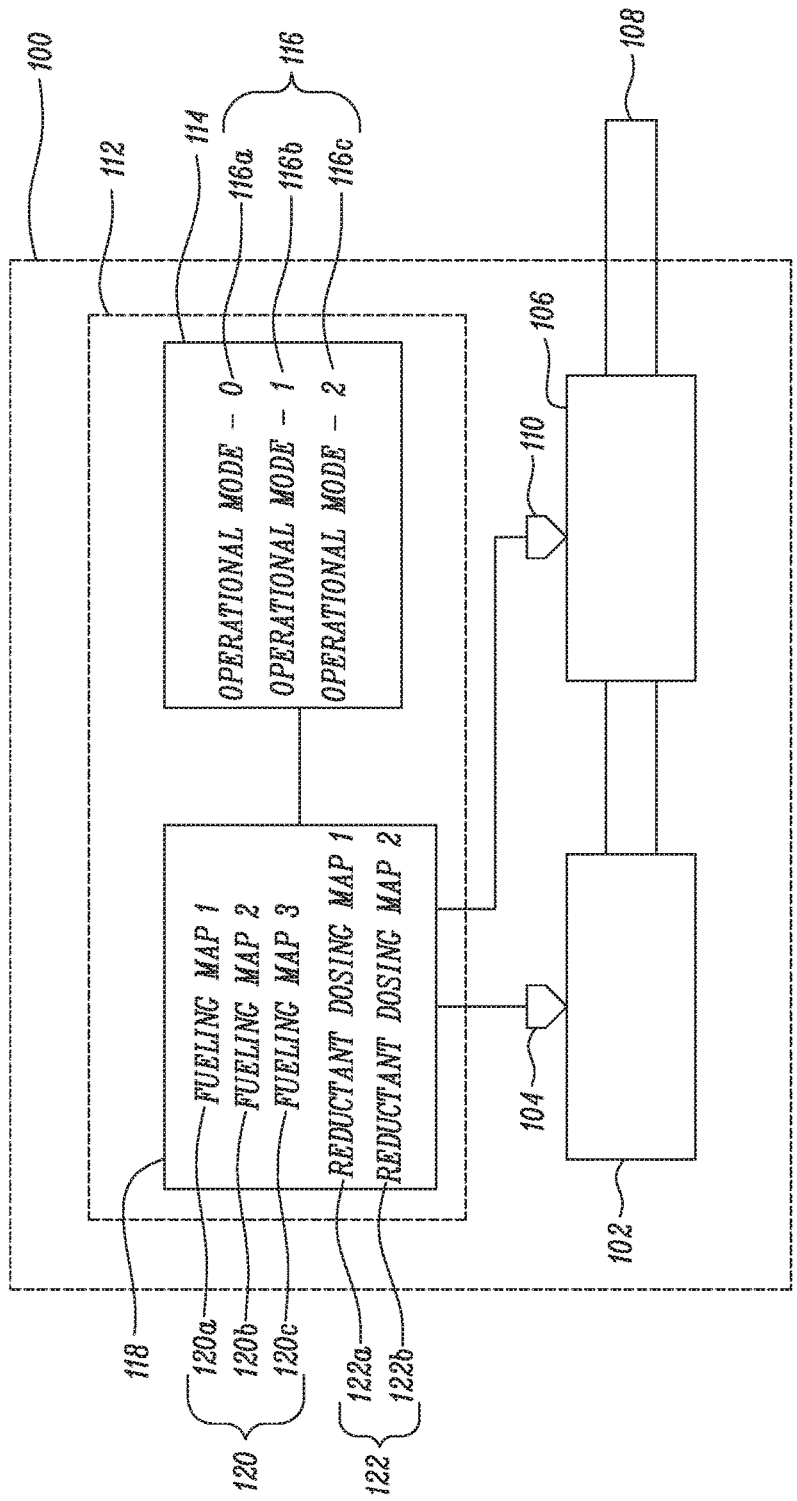
FIG. 1 is a diagrammatic illustration of an engine system showing an exemplary engine and an after-treatment system that are in communication with an emissions control system for regulating emissions, in accordance with an embodiment of the present disclosure.

The detailed description of embodiments of the disclosure herein makes reference to the accompanying drawings and figures, which show the exemplary embodiments by way of illustration only. While these embodiments are described in sufficient detail to enable those skilled in the art to practice the disclosure, it should be understood that other embodiments may be realized and that logical changes may be made without departing from the spirit and scope of the disclosure. It will be apparent to a person skilled in the pertinent art that this disclosure can also be employed in a variety of other applications in which regulation of exhaust emissions and compliance of exhaust emissions with changing emission regulation standards is required. Thus, the detailed description herein is presented for purposes of illustration only and not of limitation.

For the sake of brevity, conventional data networking, application development and other functional aspects of the systems (and components of the operating systems) may not be described in detail herein. Furthermore, the connecting lines shown in the various figures contained herein are intended to represent exemplary functional relationships and/or physical/communicative couplings between the various elements. It should be noted that many alternative or additional functional relationships or physical/communicative connections may be present in a practical system.

The present disclosure is described herein with reference to system architecture, block diagrams and flowchart illustrations of methods, and computer program products according to various aspects of the disclosure. It will be understood that each functional block of the block diagrams, the flowchart illustrations, and combinations of functional blocks in the block diagrams, the flowchart illustrations, and combinations of functional blocks in the block diagrams, respectively, can be implemented by computer program instructions.

These computer program instructions may be loaded onto a general purpose computer, special purpose computer, or other programmable data processing apparatus to produce a system, such that the instructions that execute on the computer-based system or other programmable data processing apparatus create means for implementing the functions specified in the flowchart block or blocks. These computer program instructions may also be stored in a computer-readable memory that can direct a computer-based system or other programmable data processing apparatus to function in a particular manner, such that the instructions stored in the computer-readable memory produce output/s that implement the function specified in the flowchart block or blocks. The computer program instructions may also be loaded onto a computer-based system or other equivalent programmable data processing apparatuses to cause a series of operational steps to be performed on the computer-based system or on the other programmable data processing apparatus to produce a computer-implemented method such that the instructions which execute on the computer-based system or on the other programmable data processing apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. It should be further appreciated that the multiple steps as illustrated and described as being combined into a single step for the sake of simplicity may be expanded into multiple steps. In other cases, steps illustrated and described as single process steps may be separated into multiple steps but have been combined for simplicity.

It may be further noted that references in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, element, or characteristic is described in connection with an embodiment, it would be within the knowledge of one skilled in the art to affect such feature, element, or characteristic in connection with other embodiments whether or not explicitly described.

The systems and methods disclosed in conjunction with various embodiments of the present disclosure are embodied in systems and methods for regulating emissions from an engine system. Specific nomenclature used herein is merely exemplary and only used for descriptive purposes. Hence, such nomenclature must not be construed as being limiting of the scope of the present disclosure.

The present disclosure is now described in more detail herein in terms of the above disclosed exemplary embodiments of system and methods. This is for convenience only and is not intended to limit the application of the present disclosure. In fact, after reading the following description, it will be apparent to one skilled in the relevant art(s) how to implement the following disclosure in alternative embodiments.

With reference to FIG. 1, an engine system 100 is depicted, in accordance with embodiments of the present disclosure. As shown, the engine system 100 includes an engine 102. The engine 102 disclosed herein may be a spark-ignited (SI) engine or a compression-ignited (CI) engine. The engine 102 may include a fuel delivery system 104 that is configured to deliver fuel to one or more cylinders (not shown) of the engine 102.

Moreover, as shown in the illustrated embodiment of FIG. 1, the engine system 100 additionally includes an after-treatment system 106 that is located downstream and disposed in fluid communication with the engine 102. The after-treatment system 106 is configured to receive exhaust emissions from the engine 102. When operational, the after-treatment system 106 would be configured to increase a quality of exhaust emissions, for instance, by reducing Nitrous Oxides ($NO_x$) present in the products of combustion released by the engine 102 before being released into the atmosphere via an outlet 108 located downstream of the after-treatment system 106.

In embodiments of this disclosure, the after-treatment system 106 is embodied in the form of a Selective Catalytic Reduction (SCR) device that is provided with a reductant dosing system 110 for introducing a reductant for instance, aqueous Urea in the form of a Diesel Exhaust Fluid (DEF) into the SCR device. However, it may be noted that the after-treatment system 106 is not limited to an SCR device alone. Additionally, or optionally, the after-treatment system 106 may include other components including, but not limited to, a Diesel Particulate Filter (DPF), a Decomposition Reactor, and other components known to persons skilled in the art.

The engine system 100 also includes an emissions control system 112 (hereinafter referred to as 'the control system' and designated using identical reference numeral '112'). The control system 112 includes an input device 114 that is configured to provide a plurality of user-selectable operational modes 116 for the engine 102 and the after-treatment system 106. For instance, in the illustrated embodiment of FIG. 1, three operational modes 116—namely a zeroth operational mode, a first operational mode, and a second operational mode are depicted and individually referenced using alpha-numerals '116a', '116b', and '116c' respectively. It may be noted that the three operational modes 116a-116c are non-limiting of this disclosure. In other embodiments, fewer or more operational modes may be implemented as user-selectable options on the input device 114 depending on specific requirements of an emissions control application.

Figure 2:
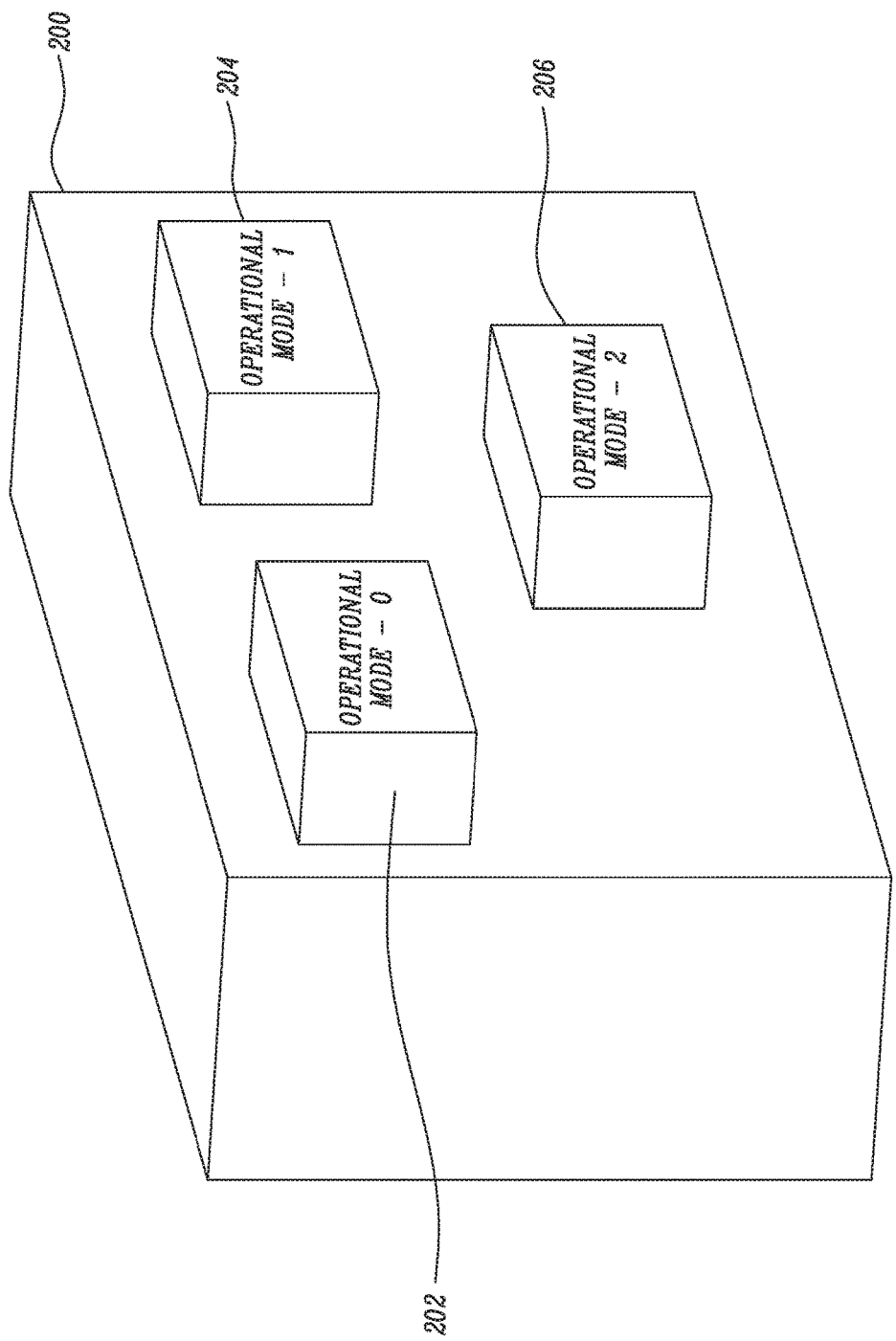
FIG. 2 is a diagrammatic illustration of an input device associated with the emissions control system and embodied in the form of a physical input device, in accordance with an exemplary embodiment of the present disclosure.

The input device 114 disclosed herein, may be embodied in the form of a physical input device 200 that, according to an exemplary embodiment, is depicted in FIG. 2. The physical input device 200 may include physical buttons 202, 204, 206. The physical button 202 may be selected to activate operational mode-0 (designated by numeral 116a in the illustrated embodiment of FIG. 1). The physical button 204 may be selected to activate operational mode-1 (designated by numeral 116b in the illustrated embodiment of FIG. 1). The physical button 206 may be selected to activate operational mode-2 (designated by numeral 116c in the illustrated embodiment of FIG. 1).

Figure 3:
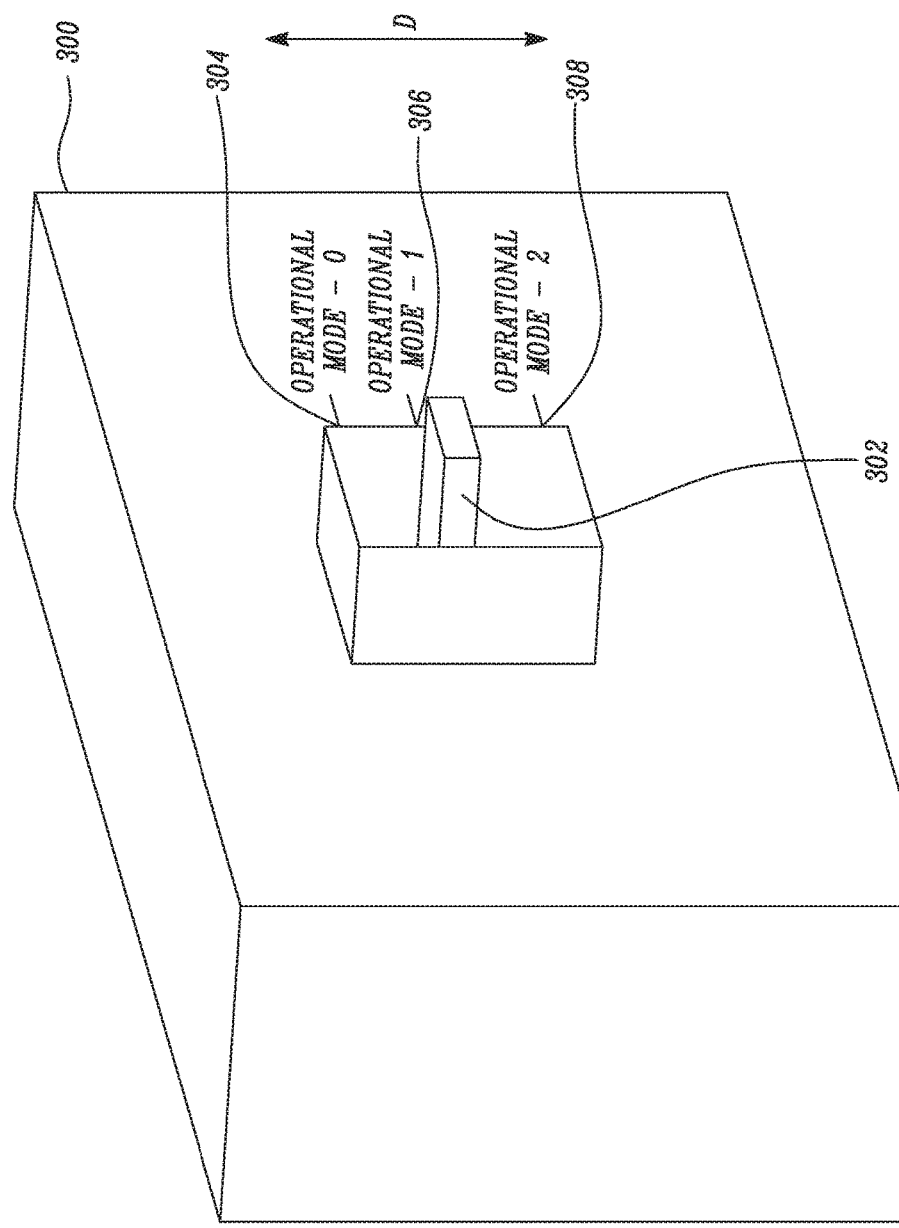
FIG. 3 is a diagrammatic illustration of the input device embodied in the form of a physical input device, in accordance with another exemplary embodiment of the present disclosure.

Alternatively, the input device 114 disclosed herein, could be embodied in the form of another physical input device 300 that, according to an exemplary embodiment, is depicted in FIG. 3. This physical input device 300 may include a control lever 302 that may be pushed up or pulled down along a substantially vertical direction by a user to execute its functions, as depicted by a two-way arrow 'D'. Particularly, the control lever 302 can be used to select operational mode-0 (denoted by alpha-numeral 116a in FIG. 1) when moved into position 304 as shown in FIG. 3. Similarly, the control lever 302 can be used to select operational mode-1 (denoted by alpha-numeral 116b in FIG. 1) when moved into position 306, or operational mode-2 (denoted by alpha-numeral 116c in FIG. 1) when moved into position 308 as shown in FIG. 3.

Figure 4:
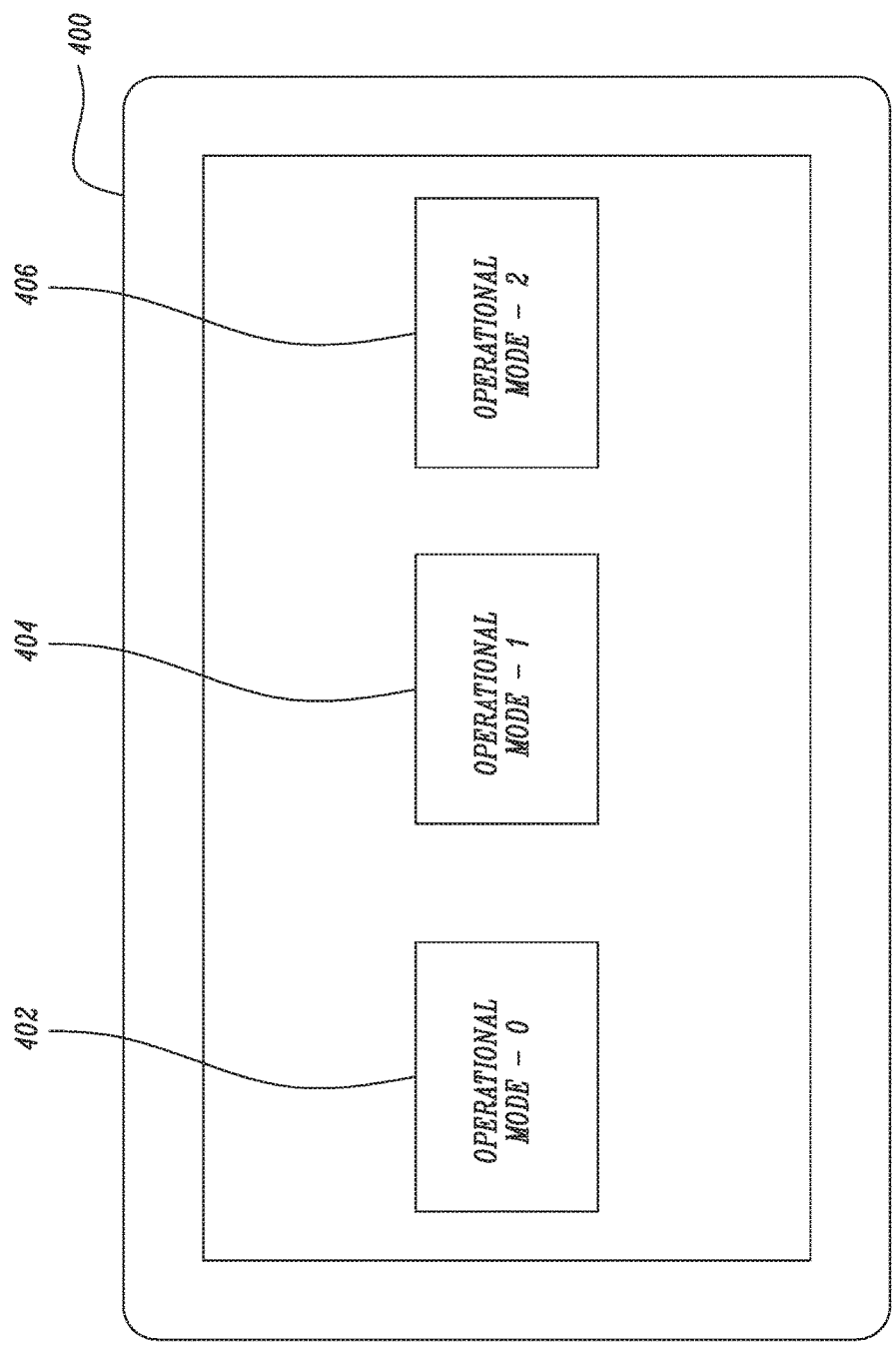
FIG. 4 is a diagrammatic illustration of an input device embodied in the form of a Graphical User Interface (GUI), in accordance with another exemplary embodiment of the present disclosure.

In yet another alternative embodiment, the input device 114 disclosed herein, could be embodied in the form of a Graphical User Interface (GUI) 400 providing user-selectable options 402, 404, 406 corresponding to user-selectable operational modes 116a, 116b, 116c shown in FIG. 1. The user-selectable options 402, 404, 406 presented by the GUI 400 would be configured to receive tactile inputs from a user corresponding to a desired operational mode 116, that is, 116a, 116b, or 116c. Additionally, or optionally, this GUI 400 may reside on a portable device exemplarily illustrated in FIG. 4. Examples of the portable device may include, but are not limited to, a mobile terminal, a mobile telephone, a smart phone, a Mobile Internet Device (MID), a phablet computer, a tablet computer, an Ultra-mobile personal computer (UMPC), a Personal Digital Assistant (PDA), a web pad, a handheld PC, and a laptop computer.

In embodiments of this disclosure, each operational mode 116 corresponds to an emission regulation standard. For example, operational mode 0 (denoted by alpha-numeral 116a in FIG. 1) could be configured to correspond with an IMO (International Maritime Organization)-I standard, while operational modes 1 and 2 (denoted by alpha-numerals 116b and 116c respectively in FIG. 1) could be configured to correspond with IMO-II standard and IMO-III standard respectively.

Referring to FIG. 1, the control system 112 also includes a control module 118 that is communicably coupled to the input device 114. The control module 118 is configured to optimize engine fueling and selectively optimize reductant dosing for the engine 102 and the after-treatment system 106 respectively based on the operational mode 116a, 116b, or 116c selected from the plurality of operational modes 116.

In an embodiment as illustrated in FIG. 1, the control module 118 may be configured with at least a pair of pre-defined engine fueling maps 120 and at least a pair of pre-defined reductant dosing maps 122 therein. As shown in the illustrated embodiment of FIG. 1, the control module 118 includes three pre-defined engine fueling maps 120a, 120b, 120c and a pair of pre-defined reductant dosing maps 122a, 122b. Although three engine fueling maps 120a, 120b, 120c and a pair of reductant dosing maps 122a, 122b are disclosed herein, in other embodiments, it can be contemplated to include fewer or more engine fueling maps 120 and fewer or more reductant dosing maps 122 depending on specific requirements of an application.

The control module 118 disclosed herein could include various software and/or hardware components that are configured to perform functions consistent with the present disclosure. As such, the control module 118 of the present disclosure may be a stand-alone control module or may be configured to co-operate with an existing electronic control module (ECU) (not shown) of a machine, for instance, a marine vessel. Further, the control module 118 may embody a single microprocessor or multiple microprocessors that include components for selectively and independently actuating specific system hardware associated with each of the fuel delivery system 104 and the reductant dosing system 110.

Numerous commercially available microprocessors can be configured to perform the functions of the control module 118 disclosed herein. It should be appreciated that the control module 118 could readily be embodied in a general machine microprocessor capable of controlling numerous machine functions. The control module 118 may include a memory, a secondary storage device, a processor, and any other components for running an application. Various other circuits may be associated with the control module 118 such as power supply circuitry, signal conditioning circuitry, solenoid driver circuitry, and other types of circuitry. Various routines, algorithms, and/or programs can be programmed within the control module 118 for execution thereof to actuate specific system hardware associated with each of the fuel delivery system 104 and the reductant dosing system 110.

In response to a selection of one of the operational modes 116, the control module 118 may be configured to activate one of the pre-defined engine fueling maps 120 and selectively activate one of the pre-defined reductant dosing maps 122 based on the selected operational mode 116a, 116b, or 116c such that during subsequent operation of the engine system 100, the engine 102 and the after-treatment system 106 are configured to comply with the selected operational mode 116a, 116b, or 116c corresponding to a desired one of the emission regulation standards, for example, IMO-I, II, or III respectively.

Further, in embodiments of this disclosure, in response to a selected one of the operational modes 116a, 116b, or 116c and to comply with the desired emission regulation standard, the control module 118 may be configured to independently and selectively vary an amount of fuel dispensed to the engine 102 via the fuel delivery system 104 during each injection event, and an injection timing associated with the fuel dispensed to the engine 102 via the fuel delivery system 104 such that the amount of fuel and the injection timing corresponds with the activated one of the engine fueling maps 120a, 120b, or 120c.

With implementation of the engine fueling map 120a, 120b, or 120c and subsequent variation in the amount of fuel and injection timing associated with the fuel dispensed to the engine 102, it is envisioned that the engine 102 would be operated to regulate other products of combustion therefrom to comply with the desired emission regulation standard for example, IMO-I or IMO-II or IMO-III corresponding to the selected operational mode 116a, 116b, or 116c. Other products of combustion from the engine 102 that could be regulated by activation of the selected operational mode 116a, 116b, or 116c may include, but are not limited to, Carbon Monoxide (CO), Sulphur Oxides (SOx), and/or Particulate Matter (PM).

Additionally, or optionally, in response to a selected one of the operational modes 116a, 116b, or 116c, the control module 118 could also be configured to vary an amount of reductant to be dispensed to the after-treatment system 106 via the reductant dosing system 110 such that the amount of reductant corresponds with the activated one of the reductant dosing maps 122a or 122b.

Figure 5:
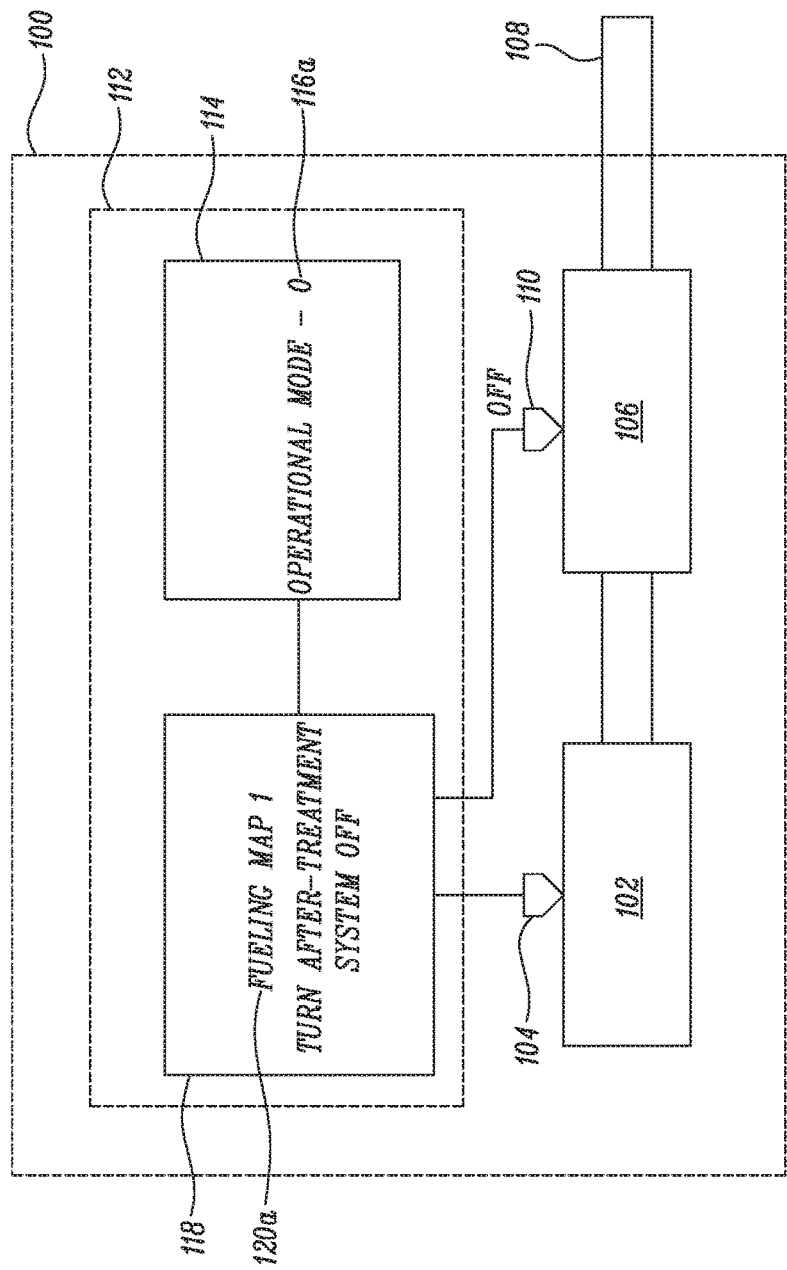
FIG. 5 is a schematic illustration of a first configuration of the engine system, in accordance with an embodiment of the present disclosure.

Referring to FIGS. 1 and 5, in an embodiment of the present disclosure, if the operational mode-0 116a is selected at the input device 114, then the control module 118 is configured to activate a first engine fueling map 120a and switch OFF the after-treatment system 106, for example, by turning OFF the reductant dosing system 110.

Figure 6:
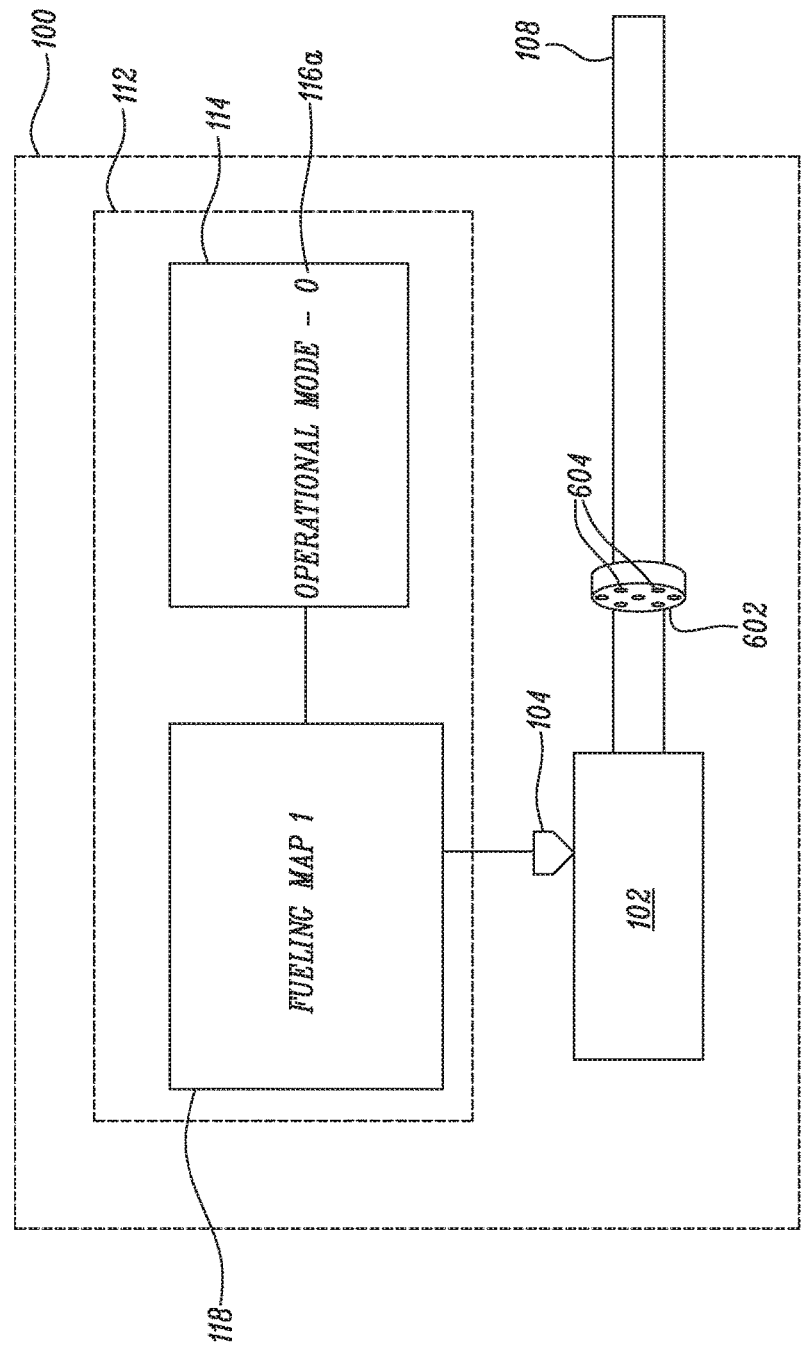
FIG. 6 is a schematic illustration of a second configuration of the engine system, in accordance with alternative embodiment of the present disclosure.

In an alternative embodiment as shown in FIG. 6, the engine 102 may be optionally provided with a restrictor plate 602 in lieu of, or in addition to, the after-treatment system 106 that is disclosed in the preceding embodiment of FIGS. 1 and 5. In this embodiment, the restrictor plate 602 is configured to operatively offer backpressure to the exhaust stream leaving the engine 102 which in turn would help to optimize an amount of air intake that is delivered to the engine 102 thereby influencing an overall air-fuel ratio ($\lambda$) with which air and fuel are introduced to the engine 102. As typically known in the art, this restrictor plate 602 may include one or more holes 604 whose size is tuned beforehand for providing an optimized amount of backpressure and therefore, causing an optimized and/or desired amount of exhaust from the engine 102 for operating the engine 102 under the operational mode-0 116a.

Figure 7:
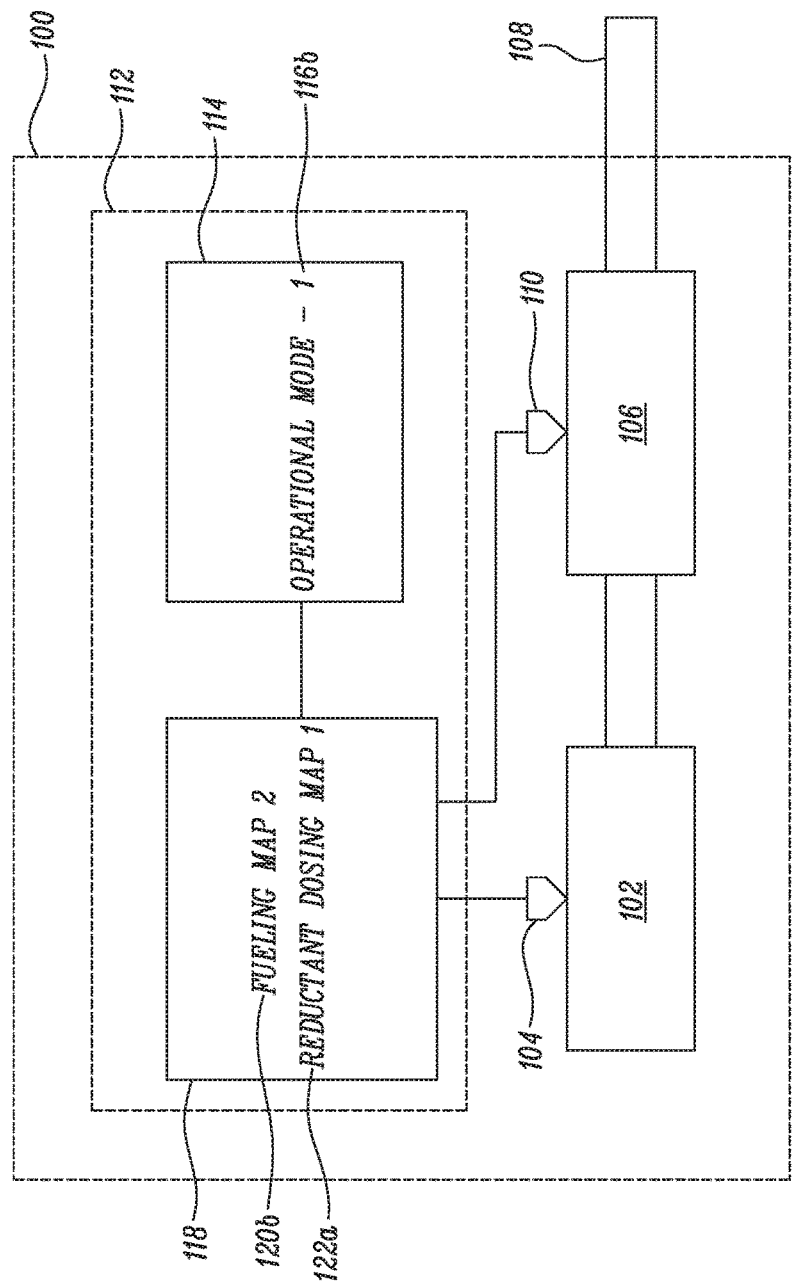
FIG. 7 is a schematic illustration of a third configuration of the engine system, in accordance with another embodiment of the present disclosure.

Referring to FIGS. 1 and 7, in another embodiment of the present disclosure, if the operational mode-1 116b is selected at the input device 114, then the control module 118 is configured to activate a second engine fueling map 120b and activate a first reductant dosing map 122a.

Figure 8:
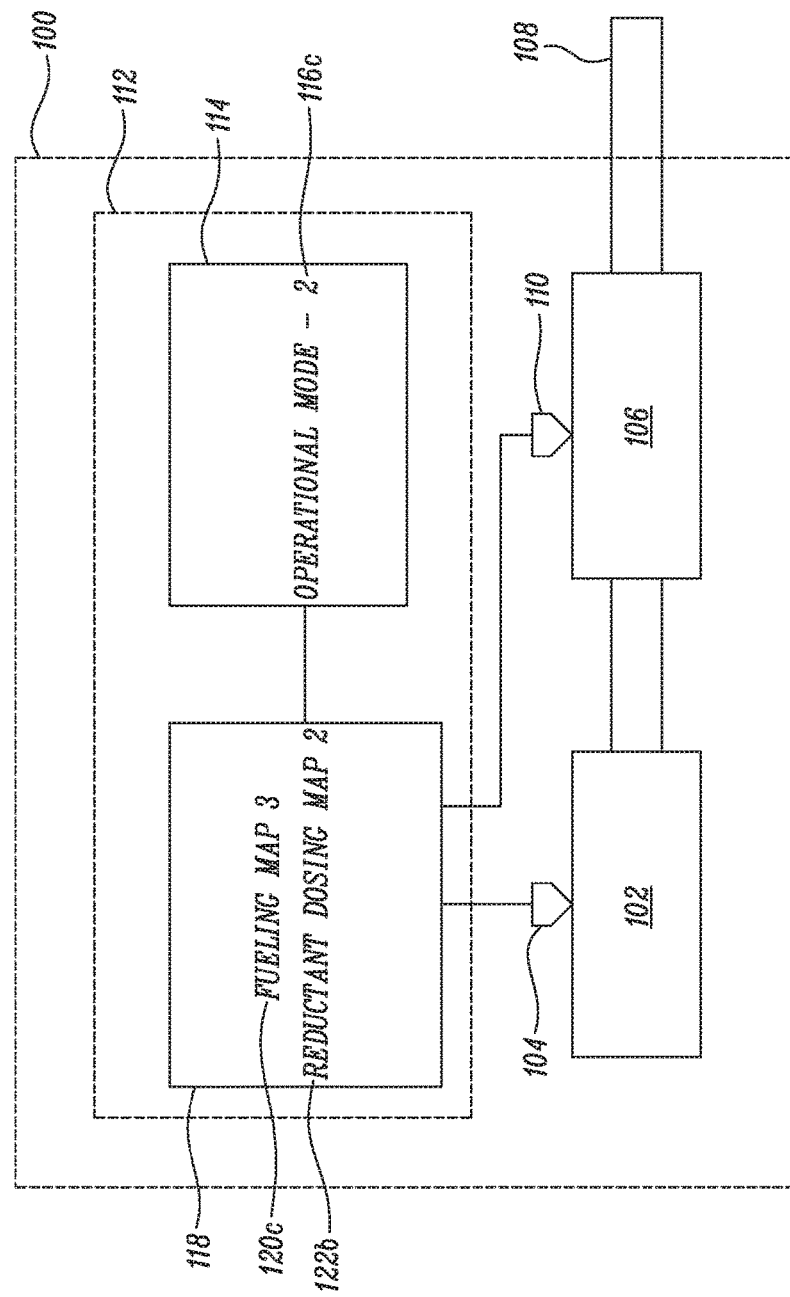
FIG. 8 is a schematic illustration of a fourth configuration of the engine system, in accordance with yet another embodiment of the present disclosure.

Referring to FIGS. 1 and 8, in another embodiment of the present disclosure, if the operational mode-2 116c is selected at the input device 114, then the control module 118 is configured to activate a third engine fueling map 120c and activate a second reductant dosing map 122b.

It should be noted that each of the engine fueling maps 120 and the reductant dosing maps 122 disclosed herein may be computed before-hand using empirical calculations incorporating theoretical models, statistical models, simulated models or combinations thereof, or from experimental data and/or trial runs performed on the engine system 100 taking into consideration the varying conditions of load and speed that could be associated with the engine 102 in operation.

Figure 9:
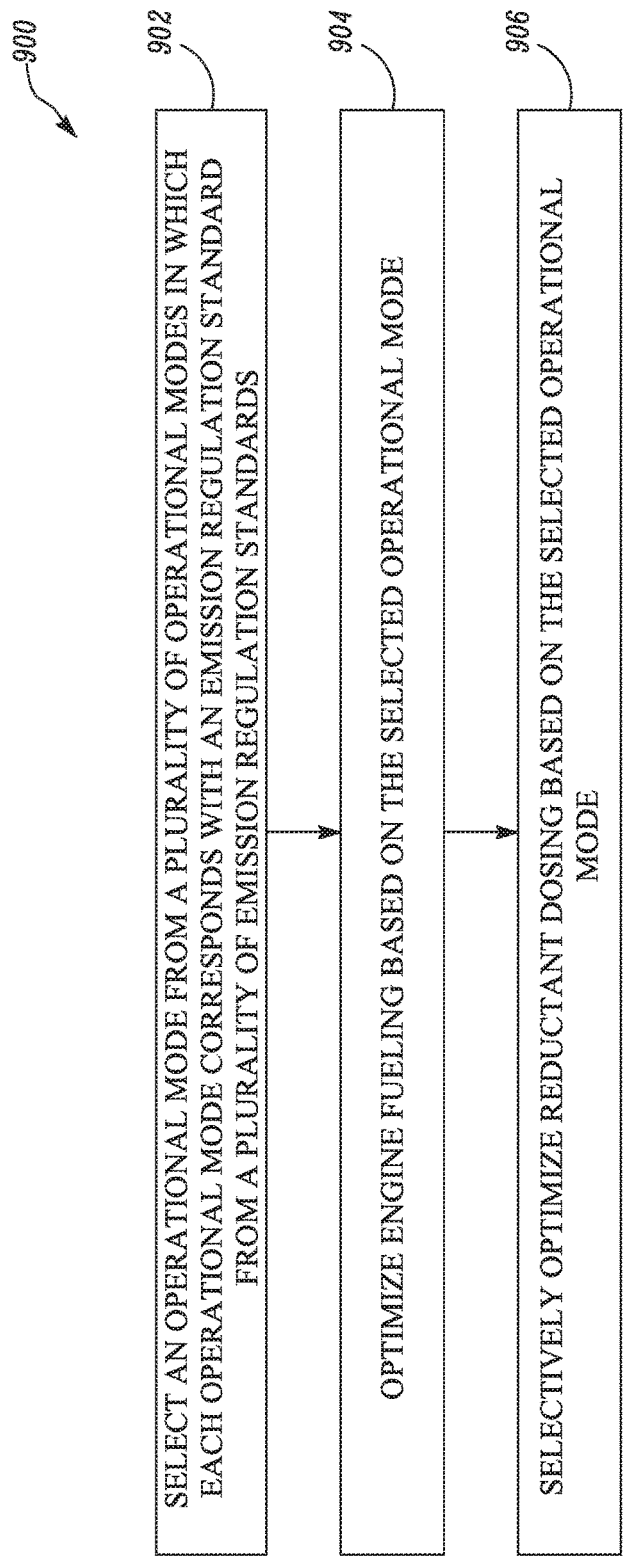
FIG. 9 is a flowchart depicting a method for regulating emissions from the engine system to comply with one of a plurality of emission regulation standards, in accordance with an embodiment of the present disclosure.

Referring to FIG. 9, a method 900 for regulating emissions from the engine system 100 to comply with one of a plurality of emission regulation standards is provided. At step 902, the method 900 includes selecting an operational mode 116a, 116b, or 116c from a plurality of operational modes 116 in which each operational mode 116a, 116b, or 116c corresponds with an emission regulation standard from the plurality of emission regulation standards.

Thereafter, at step 904, the method 900 includes optimizing, by the control module 118, engine fueling based on the selected operational mode 116a, 116b, or 116c. Further, at step 906, the method 900 also includes selectively optimizing, by the control module 118, an amount of reductant dosing based on the selected operational mode 116a, 116b, or 116c.

In embodiments of the present disclosure, the control module 118 may be implemented using one or more physical computers, embedded devices, field programmable gate arrays (FPGAs), microcontrollers, or computer systems or portions thereof. The instructions executed by the control module 118 may also be read in from a computer-readable medium. The computer-readable medium may be non-transitory, such as a CD, DVD, optical or magnetic disk, laserdisc, flash memory, embedded memory within the control module 118 or any other medium that is readable by the control module 118. In some embodiments, hardwired circuitry may be used in place of or in combination with software instructions executed by the control module 118. Communication among modules, systems, devices, and elements may be over direct or switched connections, and wired or wireless networks or connections, via directly connected wires, or any other appropriate communication mechanism. Transmission of information may be performed on a hardware layer using any appropriate system, device, or protocol, including those related to or utilizing Firewire, PCI, PCI express, CardBus, USB, CAN, SCSI, IDA, RS232, RS422, RS485, 802.11, etc. The communication among modules, systems, devices, and elements forming the control module 118 of the present disclosure may include handshaking, notifications, coordination, encapsulation, encryption, headers, such as routing or error detecting headers, or any other appropriate communication protocol or attribute. Communication may also include messages related to HTTP, HTTPS, FTP, TCP, IP, ebMS OASIS/ebXML, DICOM, DICOS, secure sockets, VPN, encrypted or unencrypted pipes, MIME, SMTP, MIME Multipart/Related Content-type, SQL, etc.

One or more software elements may be loaded onto a general-purpose computer, special purpose computer, or other programmable data processing apparatus to produce the control module 118, such that the instructions that execute on the computer or other programmable data processing apparatus create means for implementing the functions disclosed herein. These computer program instructions may also be stored in a computer-readable memory that can direct a computer or other programmable data processing apparatus to function in a particular manner, such that the instructions stored in the computer-readable memory produce instructions which implement the functions disclosed herein. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions disclosed herein.

The present disclosure (i.e., the emissions control system 112, the method 900, and any part(s) or function(s) thereof) may be implemented using hardware, software or a combination thereof, and may be implemented in one or more computer systems or other processing systems. Although the manipulations performed by the present disclosure were often referred to in terms such as optimizing and the like, which are commonly associated with mental operations performed by a human operator, no such capability of a human operator is necessary, or desirable in most cases, in any of the operations described herein, which form a part of the present disclosure. Rather, the operations are machine operations. Useful machines for performing the operations in the present disclosure may include general-purpose digital computers or similar devices.

Various embodiments disclosed herein are to be taken in the illustrative and explanatory sense, and should in no way be construed as limiting of the present disclosure. All numerical terms, such as, but not limited to, "zeroth", "first", "second", "third", or any other ordinary and/or numerical terms, should also be taken only as identifiers, to assist the reader's understanding of the various embodiments, variations, components, and/or modifications of the present disclosure, and may not create any limitations, particularly as to the order, or preference, of any embodiment, variation, component and/or modification relative to, or over, another embodiment, variation, component and/or modification.

It is to be understood that individual features shown or described for one embodiment may be combined with individual features shown or described for another embodiment. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

INDUSTRIAL APPLICABILITY

Embodiments of the present disclosure have applicability for regulating emissions from an engine system to comply with one of a plurality of emission regulation standards.

With use of embodiments disclosed herein, users of marine vessels can have flexibility to install an engine compliant with one of the emission regulation standards. If a user desires to course the marine vessel through a water body that is designated with another emission regulation standard, the user can retro-fit the after-treatment system or the restrictor plate disclosed herein. The selective retro-fitment of the after-treatment system or the restrictor plate could help save costs to the user as the user can retro-fit the after-treatment system or the restrictor plate only if needed.

Moreover, with the ability to switch between different operational modes, each of which corresponds to an emission regulation standard, users can easily render their engine systems to be compliant with changing emission regulation standards as the marine vessel courses through water bodies designated with emission regulation standards that are different from one another.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An emissions control system for an engine system, the emissions control system comprising:
   an input device configured to provide a plurality of different user-selectable operational modes for the engine system, including a zeroth operational mode, a first operational mode, and a second operational mode, wherein each operational mode corresponds to a predetermined emission regulation standard, the predetermined emission regulation standards being different for the respective operational modes, and each of the predetermined emission regulation standards corresponding to a maximum acceptable exhaust emission output amount for the engine system; and
   a control module communicably coupled to the input device, the control module configured to optimize engine fueling and selectively optimize reductant dosing for the engine system based on the operational mode selected from the plurality of operational modes, wherein in response to a selection of one of the operational modes at the input device, the control module is configured to activate one of a plurality of pre-defined engine fueling maps and selectively activate one of a plurality of pre-defined reductant dosing maps based on the selected operational mode such that during subsequent operation of the engine system, the engine system is controlled so as to comply with the selected operational mode and the corresponding predetermined emission regulation standard, and wherein the control module is operative such that:

when the zeroth operational mode is selected at the input device, the control module activates a first pre-defined engine fueling map of the plurality of pre-defined engine fueling maps, and switches OFF a reductant dosing system, when the first operational mode is selected at the input device, the control module activates a second pre-defined engine fueling map of the plurality of pre-defined engine fueling maps, and activates a first pre-defined reductant dosing map of the plurality of pre-defined reductant dosing maps, and when the second operational mode is selected at the input device, the control module activates a third pre-defined engine fueling map, and activates a second pre-defined reductant dosing map of the plurality of reductant dosing maps.

2. The emissions control system of claim 1, wherein the control module is configured to implement at least a pair of the pre-defined engine fueling maps and at least a pair of the pre-defined reductant dosing maps.

3. The emissions control system of claim 1, wherein the control module is configured to independently and selectively vary each of:

an amount of fuel dispensed to an engine associated with the engine system during each injection event, and an injection timing associated with the fuel dispensed to the engine, wherein the amount of fuel and the injection timing corresponds with the activated one of the pre-defined engine fueling maps in response to the selected one of the operational modes; and an amount of reductant to be dispensed to the after-treatment system associated with the engine system, wherein the amount of reductant corresponds with the activated one of the pre-defined reductant dosing maps in response to the selected one of the operational modes.

4. An engine system comprising:

an engine;

a control system disposed in communication with the engine, the control system comprising:

an input device configured to provide a plurality of different user-selectable operational modes, including a zeroth operational mode, a first operational mode, and a second operational mode, wherein each operational mode corresponds to a predetermined emission regulation standard, the predetermined emission regulation standards being different for the respective operational modes, and each of the predetermined emission regulation standards corresponding to a maximum acceptable exhaust emission output amount for the engine system; and a control module communicably coupled to the input device, the control module configured to optimize engine fueling and selectively optimize reductant dosing based on the operational mode selected from the plurality of operational modes, wherein in response to a selection of one of the operational modes at the input device, the control module is configured to activate one of a plurality of pre-defined engine fueling maps and selectively activate one of a plurality of pre-defined reductant dosing maps based on the selected operational mode such that during subsequent operation of the engine system, the engine system is controlled so as to comply with the selected operational mode and the corresponding predetermined emission regulation standard, and wherein the control module is operative such that:

when the zeroth operational mode is selected at the input device, the control module activates a first pre-defined engine fueling map of the plurality of pre-defined engine fueling maps, and switches OFF a reductant dosing system, when the first operational mode is selected at the input device, the control module activates a second pre-defined engine fueling map of the plurality of pre-defined engine fueling maps, and activates a first pre-defined reductant dosing map of the plurality of pre-defined reductant dosing maps, and when the second operational mode is selected at the input device, the control module activates a third pre-defined engine fueling map, and activates a second pre-defined reductant dosing map of the plurality of reductant dosing maps.

5. The engine system of claim 4, wherein the control module is configured to implement at least a pair of the pre-defined engine fueling maps and at least a pair of the pre-defined reductant dosing maps.

6. The engine system of claim 4, further comprising:

an after-treatment system located downstream of the engine, the after-treatment system communicably coupled to the control module and disposed in fluid communication with the engine; and the reductant dosing system, which is operatively connected to the after-treatment system to introduce a reductant into the after-treatment system.

7. The engine system of claim 4, wherein the control module is configured to independently and selectively vary each of:

an amount of fuel dispensed to the engine during each injection event, and an injection timing associated with the fuel dispensed to the engine, wherein the amount of fuel and the injection timing corresponds with the activated one of the engine fueling maps in response to the selected one of the operational modes; and an amount of reductant to be dispensed to the after-treatment system, wherein the amount of reductant corresponds with the activated one of the reductant dosing maps in response to the selected one of the operational modes.

8. A method for regulating emissions from an engine system to comply with one of a plurality of emission regulation standards, the method comprising:

selecting, using an input device, an operational mode from a plurality of different operational modes, including a zeroth operational mode, a first operational mode, and a second operational mode, wherein each operational mode corresponds with a predetermined emission regulation standard from the plurality of emission regulation standards, the predetermined emission regulation standards being different for the respective operational modes, and each of the predetermined emission regulation standards corresponding to a maximum acceptable exhaust emission output amount for the engine system;

optimizing, using a control module, engine fueling based on the selected operational mode, said optimizing including activating a pre-defined engine fueling map corresponding to the selected operational mode from among a plurality of pre-defined engine fueling maps; and selectively optimizing, using the control module, reductant dosing based on the selected operational mode, said selectively optimizing including selectively activate a pre-defined reductant dosing map corresponding to the selected operational mode from among a plurality of pre-defined reductant dosing maps, wherein said optimizing and said selectively optimizing are such that during subsequent operation of the engine system, the engine system is controlled so as to comply with the selected operational mode and the corresponding predetermined emission regulation standard, when the zeroth operational mode is selected at the input device, said activating activates a first pre-defined engine fueling map of the plurality of pre-defined engine fueling maps, and said selectively optimizing switches OFF a reductant dosing system, when the first operational mode is selected at the input device, said optimizing activates a second pre-defined engine fueling map of the plurality of pre-defined engine fueling maps, and said selectively optimizing activates a first pre-defined reductant dosing map of the plurality of pre-defined reductant dosing maps, and when the second operational mode is selected at the input device, said optimizing activates a third pre-defined engine fueling map, and said selectively activating activates a second pre-defined reductant dosing map of the plurality of reductant dosing maps.

* * * * *